United States Patent
Kumar et al.

(10) Patent No.: US 7,574,698 B2
(45) Date of Patent: Aug. 11, 2009

(54) METHOD AND APPARATUS FOR PROTECTING HTTP SESSION DATA FROM DATA CROSSOVER USING ASPECT-ORIENTED PROGRAMMING

(75) Inventors: Arun Kumar, Austin, TX (US); Rohit Singh, Weston, FL (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 11/154,161

(22) Filed: Jun. 16, 2005

(65) Prior Publication Data

US 2006/0288106 A1    Dec. 21, 2006

(51) Int. Cl.
*G06F 9/44*      (2006.01)
*G06F 15/16*    (2006.01)
*G06F 11/00*    (2006.01)

(52) U.S. Cl. .................. 717/130; 717/116; 717/127; 709/227; 714/39; 714/49

(58) Field of Classification Search .................. 719/311, 719/312; 714/37, 39, 49; 717/116, 127, 717/130

See application file for complete search history.

(56) References Cited

U.S. PATENT DOCUMENTS

| | | | |
|---|---|---|---|
| 6,098,093 A | | 8/2000 | Bayeh et al. |
| 6,393,487 B2 | | 5/2002 | Boucher et al. |
| 6,948,129 B1 | * | 9/2005 | Loghmani .................. 715/751 |
| 7,395,458 B2 | * | 7/2008 | Shrivastava et al. ........... 714/47 |
| 2002/0161839 A1 | | 10/2002 | Colasurdo et al. ........... 709/204 |
| 2003/0204769 A1 | | 10/2003 | Coughlin |

OTHER PUBLICATIONS

Liljenstam, Michael & Ogielski, Andy, Crossover Scaling Effcts in Agg. TCP Traffic with Congest. Losses, ACM SIGCOMM Comp. Com.Rev., Nov. 2002, p. 89-100, vol. 32, No. 5.
Gutzmann, Kurt, Access Control and Session Management in the HTTP Environment, IEEE Internet Computing, Jan./Feb. 2001. p. 26-35, IEEE, USA.

* cited by examiner

*Primary Examiner*—Eric B Kiss
(74) *Attorney, Agent, or Firm*—Michael R. Nichols; Casimer K. Salys

(57) ABSTRACT

A method, computer program product, and data processing system for detecting and identifying data crossover errors in servlet code are disclosed. According to a preferred embodiment, techniques of aspect-oriented programming (AOP) are used to instrument JAVA Servlet code to detect potential data crossover errors. Specifically, pointcuts are defined to intercept both the association follow an object with a particular session and the "getting" and "setting" of such objects. Advice code associated with these pointcuts is used to update and/or consult a "collator" data structure, which is used to determine if an object or variable associated with one session is being accessed by a different session. In a preferred embodiment, the AspectJ aspect-oriented programming language/system is used to define the pointcuts and advice code.

1 Claim, 8 Drawing Sheets

METHOD AND APPARATUS FOR PROTECTING HTTP SESSION DATA FROM DATA CROSSOVER USING ASPECT-ORIENTED PROGRAMMING

BACKGROUND OF THE INVENTION

1. Technical Field

The present invention relates generally to persistent web sessions. In particular, the present invention is directed to a method and apparatus for preventing the crossover of persistent data from one web session to another.

2. Description of the Related Art

Since the introduction of the World Wide Web and the subsequent commercialization of the Internet, the world has become a considerably more connected place. No longer bound to the primitive communications interfaces of the past, the Internet is now host to a variety of powerful communications media, including interactive hypertext browsing (the World Wide Web), instant messaging, streaming video and audio, and multimedia electronic mail.

Hypertext is a method of organizing textual and graphical information on a computer screen. Information is organized into "pages," which resemble printed pages in a book or (perhaps more accurately) printed scrolls (since a hypertext page can be of any length). The primary difference between hypertext and the printed word, however, lies in the fact that hypertext pages can contain links. That is, a portion of a hypertext document, such as a phrase or a graphic, may be made sensitive to clicking by the mouse such that when the user clicks on that portion, the user is directed to a new page or a different section of the current page. For instance, it is a common practice to make bibliographic citations into links. When a user clicks on one of these citations, the cited text appears on the screen. Hypertext documents are displayed using a program called a "browser."

The largest and best-known repository of hypertext documents is the World Wide Web, a loosely bound collection of publicly accessible hypertext documents stored on computers the world over. The World Wide Web has become the preferred Internet medium for publishable information as well as for providing such interactive features as online shopping—to the extent that the terms Internet and World Wide Web are virtually synonymous to some.

Browsers can download hypertext documents from a server with the HyperText Transfer Protocol (HTTP). HTTP allows a browser to request documents or files from a server and receive a response. In addition, when browser users enter information into a form embedded into a hypertext page, the browser transmits the information to a server using HTTP. Form information can then be passed along to applications residing on the server. Those applications can then return a result, which may be written in HTML (HyperText Markup Language). The "traditional" method for passing form data to applications was (and to some extent still is) to employ the Common Gateway Interface (CGI), which provides a uniforms programming interface between a web server and web-based applications, usually referred to as "CGI scripts," since most CGI applications are written in some form of scripting language, such as Perl.

One of the disadvantages of CGI, however, is that the CGI execution model assumes that, with each CGI request, the web server will spawn a new and separate process to execute the CGI script and service the request. On a busy server, this spawning of new processes can incur a significant amount of performance overhead. This performance problem was a primary motivation behind the creation of JAVA Servlet technology.

The JAVA Servlet API, one of the standard extension libraries to the Java programming language, addresses this performance problem by allowing multiple Web applications to be executed as threads in a single Java virtual machine that executes persistently between requests. Servlets thus avoid the high performance overhead associated with spawning a new process for each request. Another attractive feature of the Java Servlets API is that it is capable of maintaining data persistency over a Web session spanning multiple requests. As HTTP is a stateless protocol, maintaining this data persistency is a nontrivial task. The JAVA Servlets API shields the application programmer from much of this complexity.

Session tracking under the JAVA Servlets API centers around the use of Session objects. When a first request in a particular Web session is received, a Session object is created, which uniquely identifies the session. Data that must remain persistent across multiple requests in a session is associated with the Session object. When a subsequent request is received, those items of data that are associated with the Session object may be accessed, thus preserving the continuity of the session.

Sometimes, however, for one reason or another, data from one session is read by or written over by another session. In this document, this phenomenon is referred to as a "crossover error." Sometimes these errors are the result of faulty library code or faulty application code. Whatever the cause, crossover errors can result in serious breaches of privacy/security of user data. These security breaches are difficult to detect and are typically identified only after significant testing of the Web application has taken place.

What is needed, therefore, is method of automatically detecting these data crossover errors in a reliable way. The present invention provides a solution to this and other problems, and offers other advantages over previous solutions.

SUMMARY OF THE INVENTION

The present invention provides a method, computer program product, and data processing system for detecting and identifying data crossover errors in servlet code. According to a preferred embodiment, techniques of aspect-oriented programming (AOP) are used to instrument JAVA Servlet code to detect potential data crossover errors. Specifically, pointcuts are defined to intercept both the association follow an object with a particular session and the "getting" and "setting" of such objects. Advice code associated with these pointcuts is used to update and/or consult a "collator" data structure, which is used to determine if an object or variable associated with one session is being accessed by a different session. In a preferred embodiment, the AspectJ aspect-oriented programming language/system is used to define the pointcuts and advice code.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

A preferred embodiment of the present invention utilizes aspect-oriented programming (AOP) to instrument servlet code to detect data crossover errors. Before delving into the specifics of a preferred embodiment of the present invention, it is helpful to understand what is meant by aspect-oriented programming. A brief introduction to the basic concepts of aspect-oriented programming is provided here by way of illustration. Aspect-oriented programming is both a programming language paradigm as well as a scheme for the compilation and execution of programs.

Figure 1:
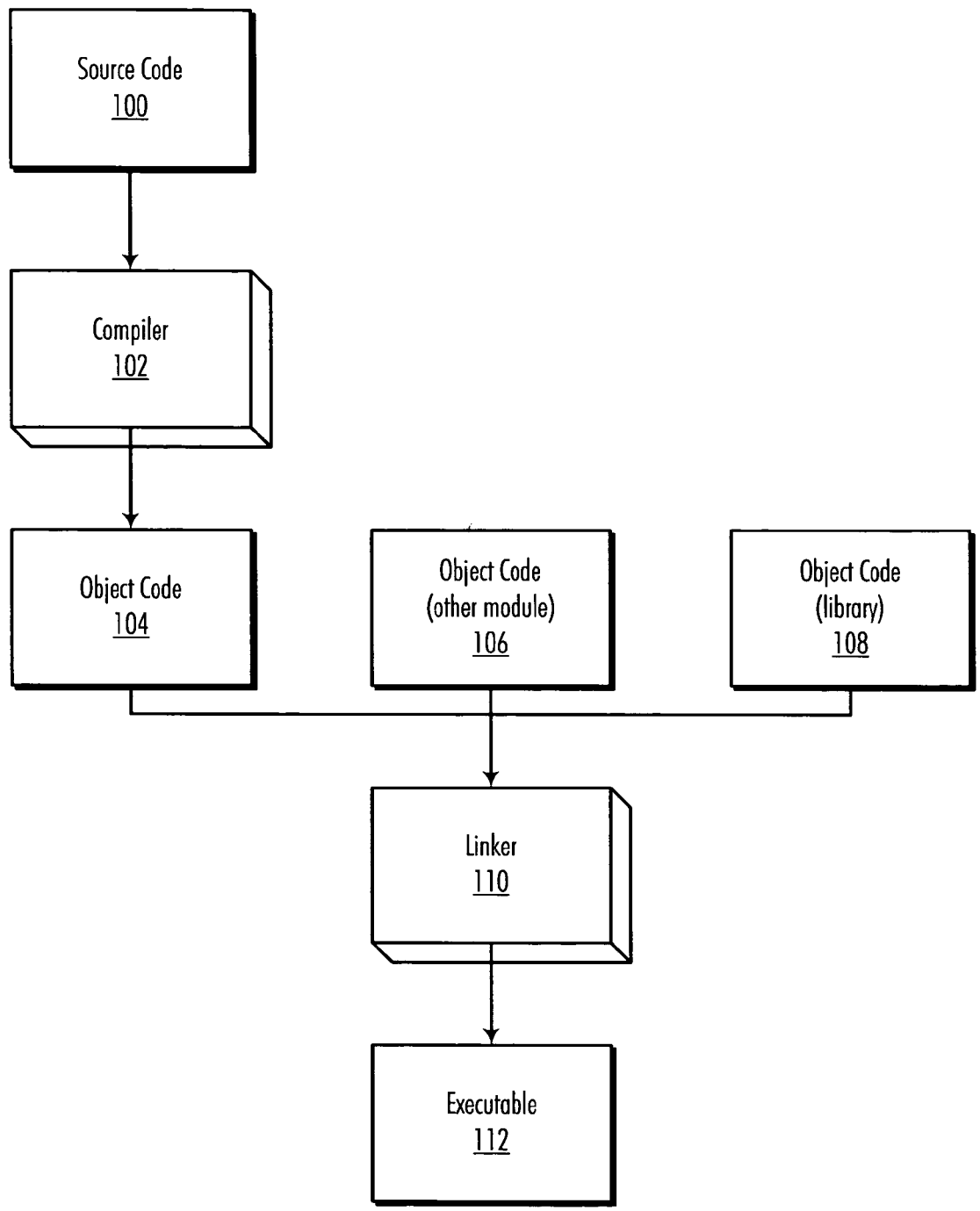
FIG. 1 is a diagram illustrating a traditional compile and link paradigm used in software development.

As shown in FIG. 1, under the traditional compilation paradigm for a computer program, source code 100 for the program is presented as input to a compiler 102, which translates source code 100 into object code 104. Object code 104 is made up of code in the native language of the computing platform (such as the hardware platform's native machine language or, in the case of a virtual machine such as a Java virtual machine, the executable bytecode the virtual machine is designed to execute). Object code 104 may be combined with other object code, such as other program modules 106 or library routines 108 by a linker 110. Linker 110 is used to combine the various individual modules of object code into an executable form 112.

Figure 2:
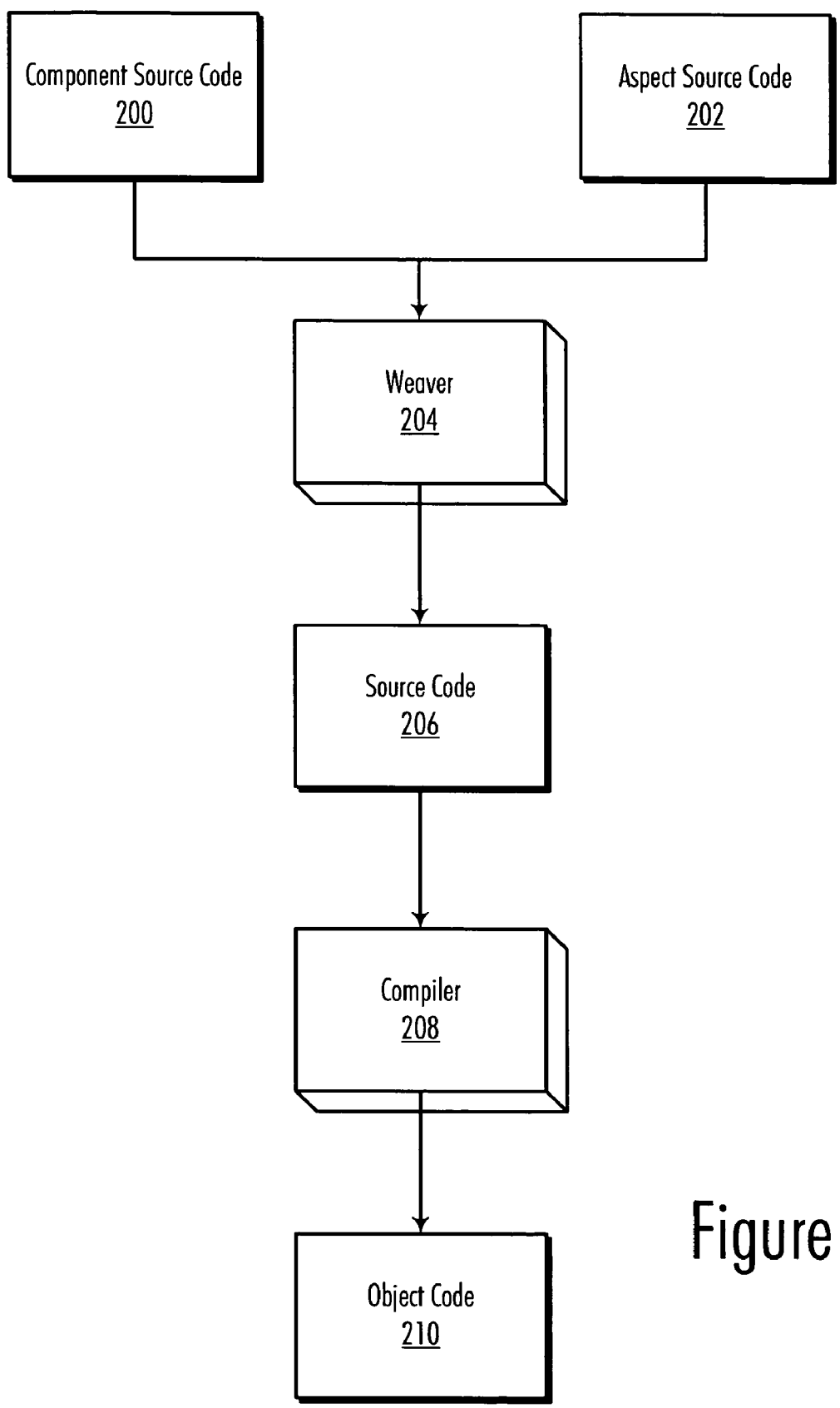
FIG. 2 is a diagram illustrating a compilation process utilizing aspect-oriented programming techniques, as might be applied to an embodiment of the present invention.

Aspect-oriented programming, on the other hand, adds an additional level of abstraction to the software development process. As shown in FIG. 2, a program is built from both component source code 200 and aspect source code 202. Component source code 200 is ordinary program code, much like source code 100 in FIG. 1. Aspect source code 202, on the other hand, is source code that operates on component source code 200 to modify and/or manipulate component source code 200 before inclusion into the final program. A development tool known as a weaver 204 performs the operations specified by aspect source code 202 on component source code 200 to obtain a resulting source code 206, which may be fed into a compiler 208 to obtain object code 210. Object code 210 may then be utilized in the same manner as object code 104 in FIG. 1.

Figure 3:
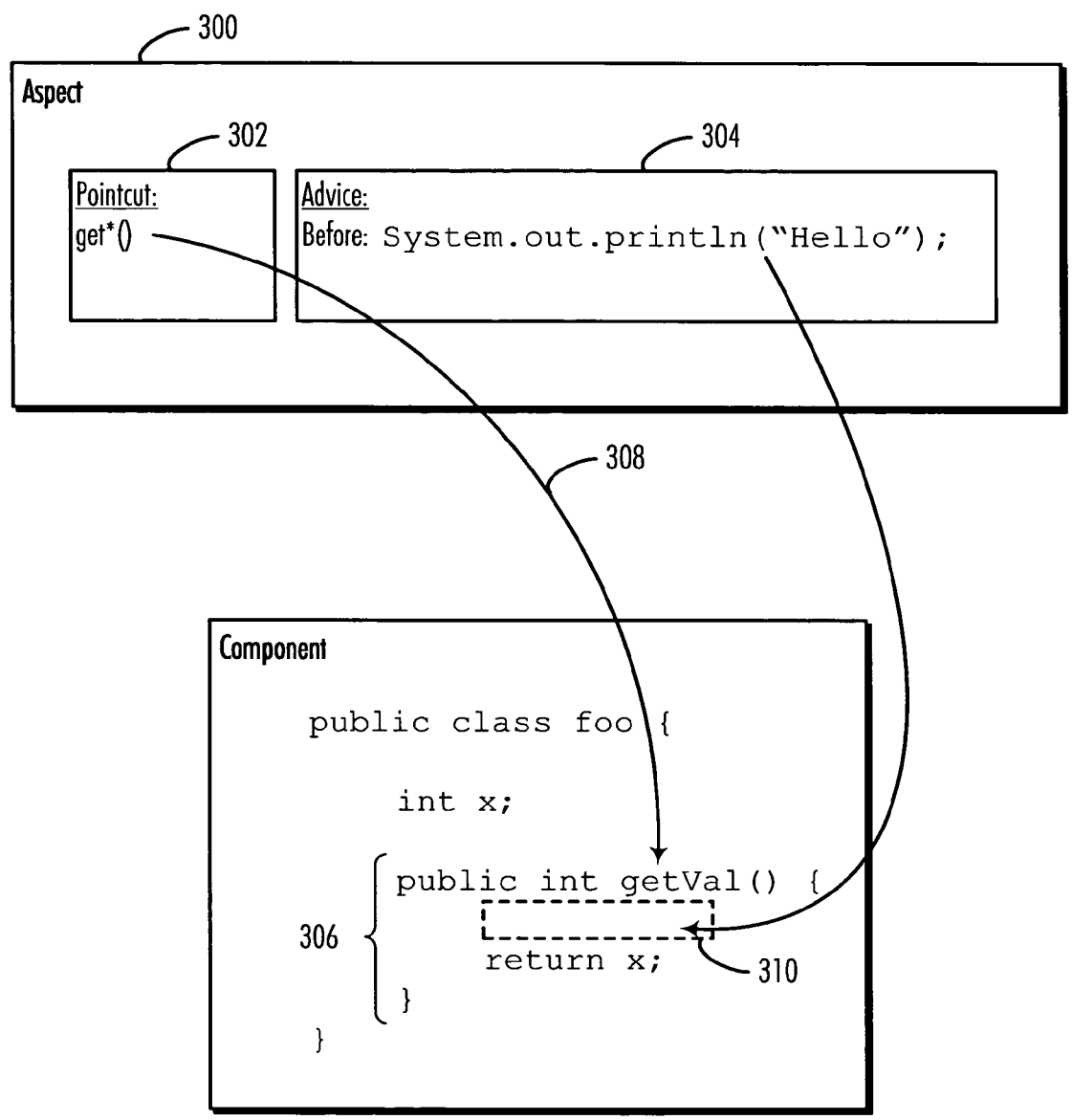
FIG. 3 is a diagram illustrating basic concepts of aspect-oriented programming as used in a preferred embodiment of the present invention.

The basic mechanism for modifying component source code 200 using aspect source code 202 is described in FIG. 3. Aspects source code, such as aspect source code 202 in FIG. 2, is comprised of aspects, such as aspect 300 in FIG. 3. Aspect 300 comprises a pointcut 302 and advice code 304. Point cut 302 comprises a pattern that is used to identify particular features in the component source code (e.g., component source code 200 in FIG. 2). Advice code 304 contains program code that is used to modify features of the component source code identified by the pattern contained in pointcut 302. Some examples of advice to include "before advice" and "after advice." "Before advice" is code that is intended to execute before the code feature identified by the pattern in the pointcut. Similarly, "after advice" is program code that is intended to be executed after the code feature identified by the pattern in the pointcut.

As shown in the example provided in FIG. 3, pointcut 302 specifies a pattern that identifies all methods beginning with the word "get." (One skilled in the art will recognize that JAVA programs often utilize a naming convention wherein methods that set attributes of objects are prefixed with the word "set" and methods that access the values of attributes of objects are prefixed with the word "get." Objects that follow this naming convention are referred to as "JavaBeans.") Pointcut 302 will therefore identify any method having a name that begins with "get." One such method is method 306, shown in FIG. 3. The fact that pointcut 302 identifies method 306 is represented in FIG. 3 by arrow 308. Advice code 304 contains before advice consisting of code to print the word "Hello" on the display console. Thus, the full semantics of aspect 300 is to identify each method having a name that begins with "get" and add code to the beginning of each such identified method to print the word "Hello" on the display console. Hence, when an aspect weaver is applied to aspect 300 and method 306, the result is to insert before advice code 304 in location 310 at the beginning of method 306.

Thus, as can be seen from FIG. 3, aspect-oriented programming provides a convenient mechanism for making global changes to program by matching patterns in the program code. Aspect-oriented programming might be thought of (in a very crude sense) as a sophisticated form of search and replace (as in a text editor or work processor). However, aspect-oriented programming is much more powerful than a textual search and replace, because aspect-oriented programming is capable of making global modifications to a program based on semantic features of the program, rather than by raw text searching. One skilled in the art will recognize that the ability AOP provides to make global changes to a complete set of program features allows modifications that might otherwise have to be manually replicated across the entire program to be made in a single operation, without risk that some of the set of features might be overlooked (as might be the case if the program were edited manually).

Figure 4:
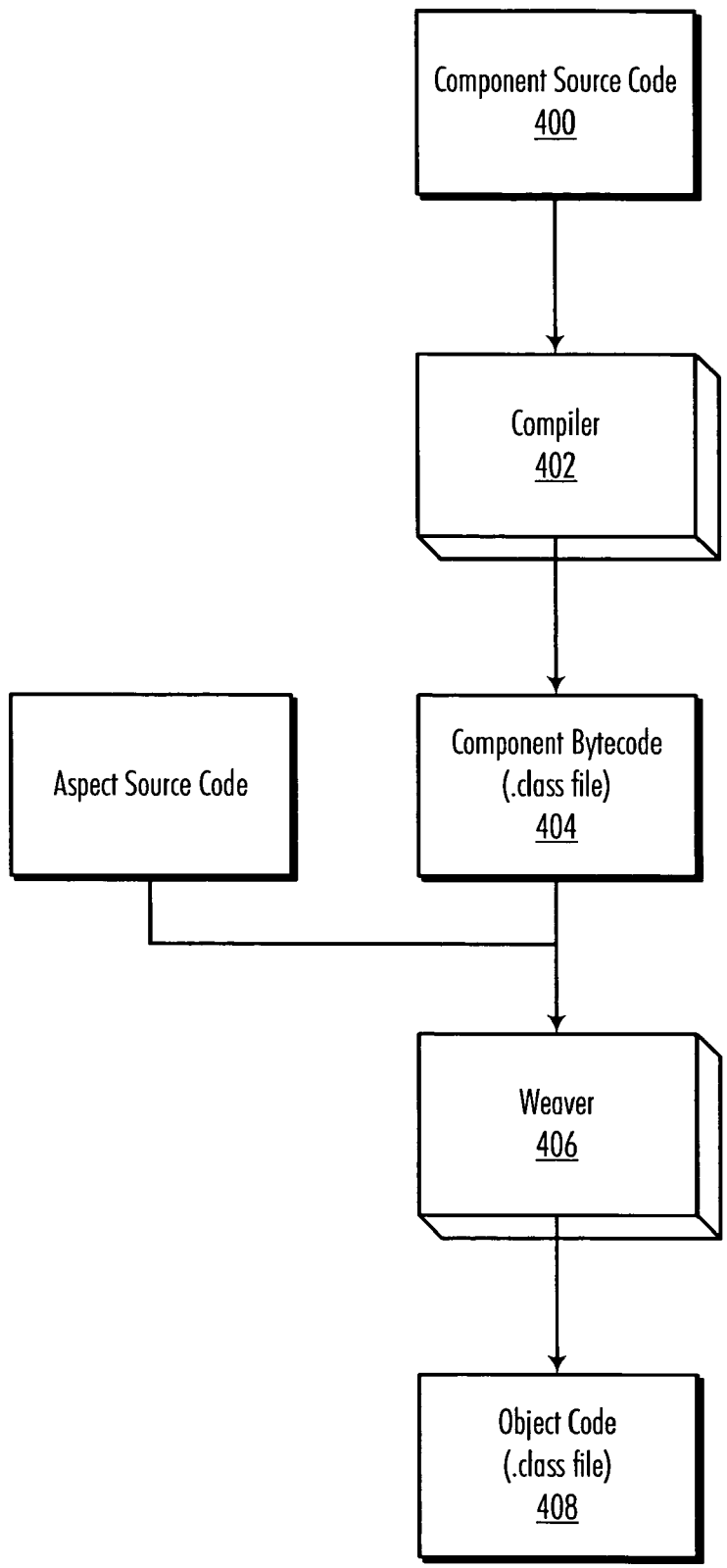
FIG. 4 is a diagram illustrating a process of instrumenting object code or bytecode, as might be applied to an embodiment of the present invention.

When dealing with component source code written in a language such as JAVA, which compiles predictably to a well-defined bytecode representation, even more sophisticated applications of aspect-oriented programming are possible. As shown in FIG. 4, one need not possess the actual component source code of the software to be modified using aspect-oriented programming. Aspects may be applied to well-defined byte code or object code (such as JAVA ".class" files). In the example depicted in FIG. 4, the original component source code (component source code 400) is already compiled (via compiler 402) into JAVA bytecode in the form of a ".class" file 404. Aspect source code 405 is then applied to bytecode 404 by weaver 406 to obtain resulting object code 308.

Figure 5:
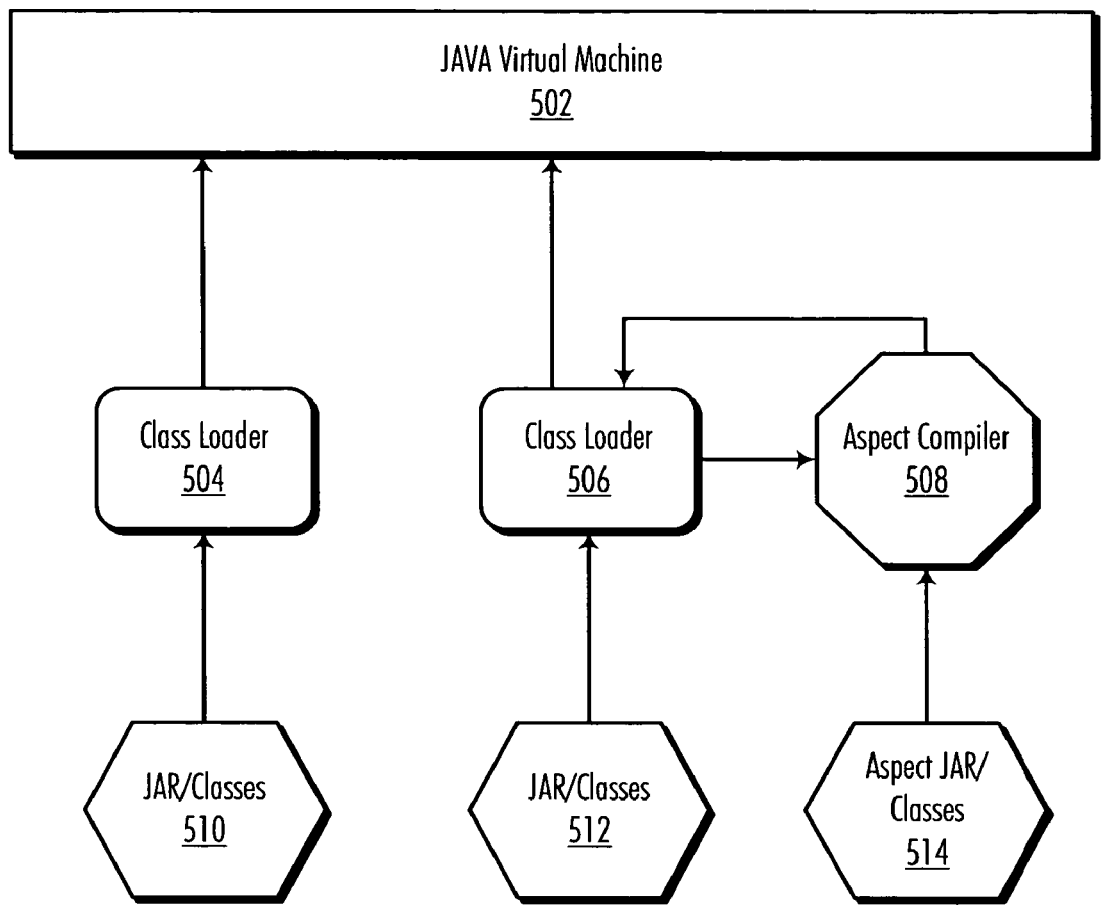
FIG. 5 is a diagram illustrating a process of instrumenting object code or bytecode dynamically at run-time as in a preferred embodiment of the present invention.

The weaving process may also be performed dynamically at runtime, as depicted in FIG. 5. In this example, a JAVA virtual machine 502 is used to execute the application. JAVA virtual machine 502 employs class loaders 504 and 506 to dynamically load and link object code in the form of JAR files and class files (e.g., JAR/classes 510 and 512). In the event that it is desired to apply aspect-oriented programming techniques in the runtime environment depicted in FIG. 5, a class loader, such as class loader 506, may be programmed to invoke an aspect compiler or weaver 508 to combine component code in the form of JAR/class files 512 with aspect JAR/class files 514 prior to dynamic linking and execution.

A preferred embodiment of the present invention detects data crossover errors by applying aspect-oriented programming techniques using the AspectJ language and development environment in the manner depicted in FIG. 5. AspectJ was developed by researchers at Xerox Palo Alto Research Center (PARC) and is freely available. AspectJ provides an aspect specification language and weaver for use with the JAVA programming language (as component language).

In this preferred embodiment, AspectJ is used to instrument JAVA servlet code to detect whether a data crossover error has occurred. In a JAVA servlet in which session tracking is performed, each session is associated with a particular session ID code, which can be retrieved using the "getId( )" method of the "javax.servlet.http.HttpSession" class in the JAVA Servlets API (one HttpSession object is created for each session utilizing HTTP). This ID is either passed through the URLs of requested servlet-based pages or set as a cookie in the client-user's web browser in order to associate separate HTTP requests as being associated with the same overall session (since HTTP is a stateless protocol).

In order to have certain pieces of information persist between multiple requests in the same session (such as the contents of a user's shopping cart in a retail web application, for example), those pieces of information must be associated with the session object for that session (typically an instance of the aforementioned "javax.servlet.http.HttpSession" class). This is done by invoking either of two equivalent methods of the session object, "putValue( )" or "setAttribute( )" (While both methods are currently available in the Servlets API, the "setAttribute( )" method is the preferred method and "putValue( )" has been demoted to deprecated status. The reason for this is that "setAttribute( )" and its companion method "getAttribute( )" follow the JavaBeans naming convention, while "getValue( )" and "putValue( )," which are the original names for these methods, do not.) The persistent data can then be retrieved in servicing a subsequent request, by invoking either the "getValue( )" method or "getAttribute( )" method.

The present invention is directed to detecting the anomalous condition in which a servlet operating in one session attempts to access information that is specific to another session. To provide this protection, a preferred embodiment of the present invention defines an associative data structure (such as an instance of a subclass of "java.util.Map") that is referred here as a "collator." The "collator" maps objects into session IDs. Thus, when a servlet is servicing a request associated with a particular session and accesses an object in the course of servicing that request, a data crossover error may be detected by consulting the collator to see if the session ID associated with that object in the collator matches the session ID of the current session.

In order to ensure maximum protection against data crossover errors, it is necessary to consult the collator each time any object is accessed to verify that no crossover has occurred. Moreover, when instance variables (also called attributes) of those objects are accessed, for maximum protection, it is also necessary to consult the collator for each instance variable accessed. A preferred embodiment of the present invention uses aspects to ensure that these safeguards are employed each and every time that an object is accessed.

Specifically, a preferred embodiment defines at least two aspects, one having a pointcut that identifies invocations of the "setValue( )" and "setAttribute( )" methods and another having a pointcut that identifies all "get" and "set" methods (which, when the JavaBeans naming convention is employed, constitute the only ways in which internal data of an object are accessed). The first of these aspects, that pertaining to the "setValue( )" and "setAttribute( )" methods, applies before advice code to register/catalog the object being associated with the current session with the session ID in the collator, along with all of its internal data objects (and their data objects, and so on, recursively). This registration process is described in more detail in FIG. 6 and the accompanying text. The second aspect, that having a pointcut that identifies all "get" and "set" methods, is used to perform the actual data crossover checking by consulting the collator, and is described in more detail in FIG. 7 and the accompanying text.

Figure 6:
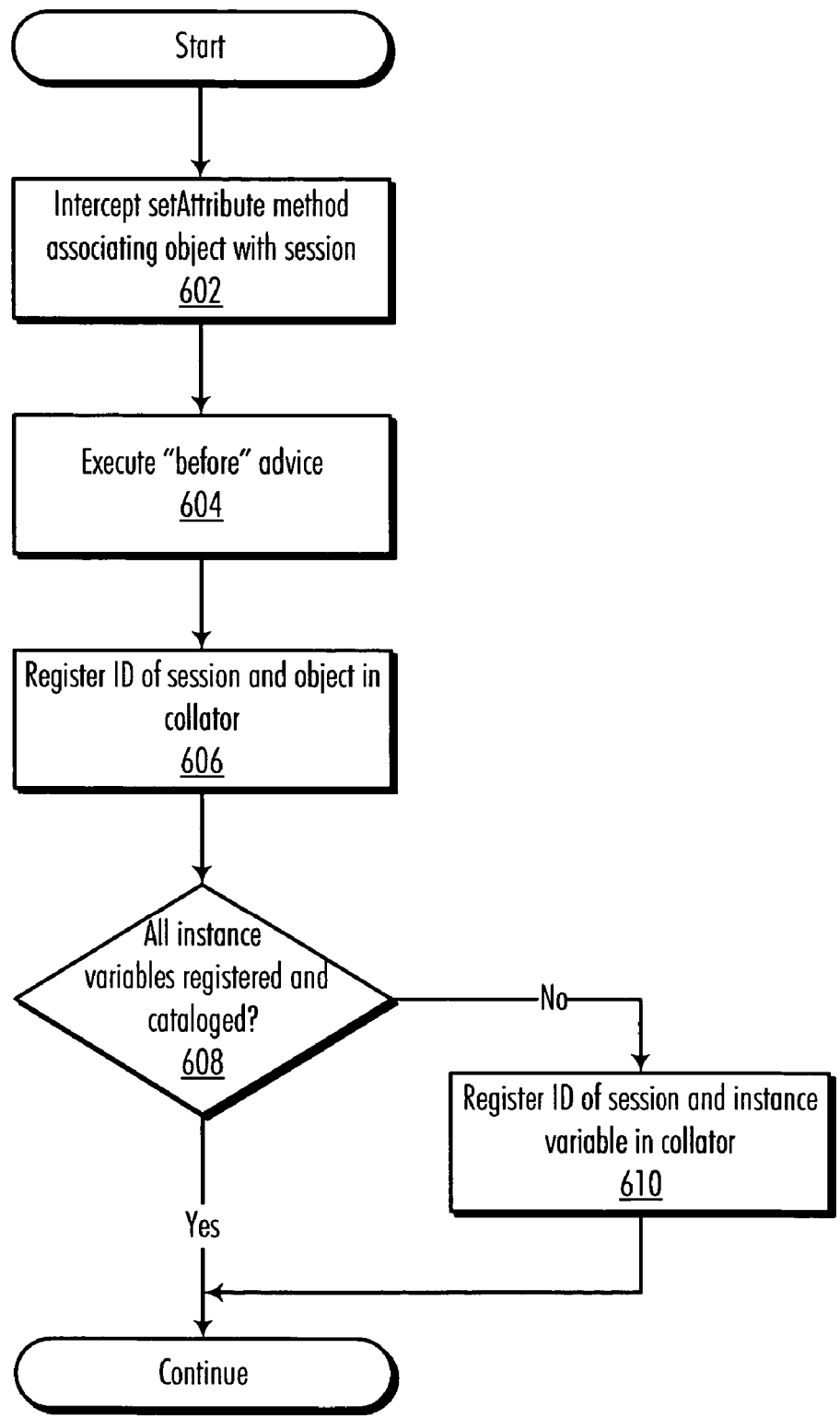
FIG. 6 is a flowchart representation of a process of registering an object with a collator in accordance with a preferred embodiment of the present invention.

FIG. 6 is a flowchart representation of a process of registering an object with a collator associative data structure in the course of associating the object with a session object in a JAVA servlet in accordance with a preferred embodiment of the present invention. The process depicted in FIG. 6 is triggered by intercepting the "setAttribute" method, which is used to associate an object with a session object in the JAVA Servlet API (block 602). This interception may be performed by using an aspect having a pointcut that identifies the "setAttribute" method and that contains before advice code to perform the registration. Therefore, the first step in executing the "setAttribute" method will be to execute the before advice from the aspect (block 604). The before advice code directs the computer to register the ID of the current session along with the object being associated with that session in the associative collator data structure (block 606) Next, a recursive process of registering and cataloging each instance variable of the object being associated with the current session, the instance variables of the values of those instance variables, and so on, is initiated. Accordingly, at block 608, a determination is made as to whether all instance variables having an association with the object being associated with the current session (by way of the "setAttribute" method) have been registered and catalogued in the collator associative data structure (block 608). If not (block 608: no), those instance variables and the ID of the current session are registered in the collator associative data structure (block 610). Once all instance variables have been registered and catalogued (block 608: yes), normal execution of the "setAttribute" method is allowed to continue.

Figure 7:
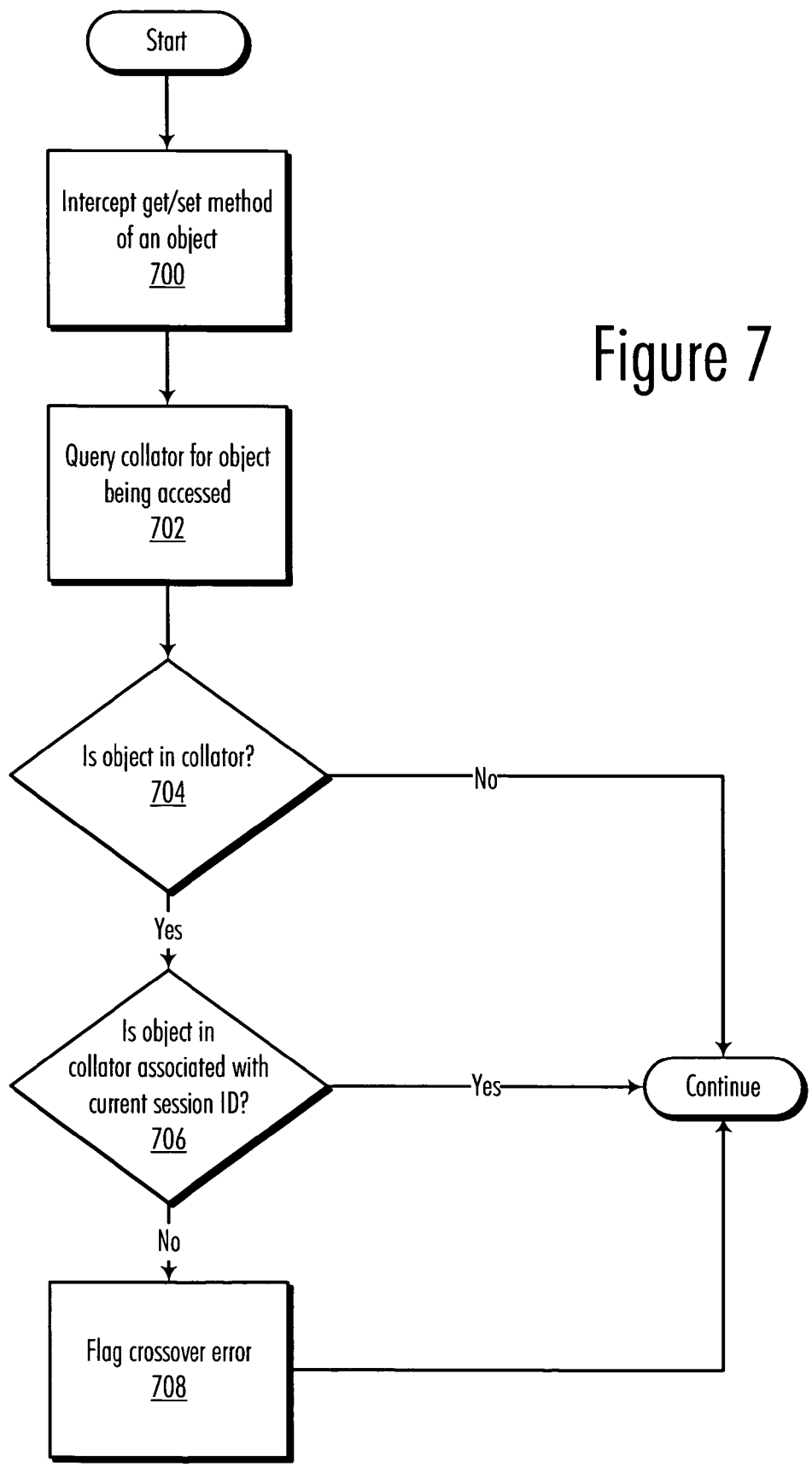
FIG. 7 is a flowchart representation of a process of detecting data crossover errors in accordance with a preferred embodiment of the present invention.

FIG. 7 is a flowchart representation of a process of detecting a data crossover error in a preferred embodiment of the present invention. An aspect having a pointcut specifying all "get" and "set" methods is used to intercept any such method call (block 700). When this happens, before advice is executed to direct the collator associative data structure to be queried for the object being accessed by the "get" or "set"

method being executed (block 702). A determination is then made as to whether the object is represented in the collator associative data structure (block 704). If not (block 704: no), then normal execution of the "get" or "set" method continues. But if the object is represented within the collator (block 704: yes), a determination is then made as to whether the object in the collator is associated with the current session ID (block 706). If so (block 706: yes), then no data crossover error has occurred, and normal execution of the "get" or "set" method continues. However, if the object in the collator is not associated with the current session ID (implying that the object is associated with a different section) (block 706: no), a crossover error is flagged (e.g., by raising a JAVA exception) (block 708).

Figure 8:
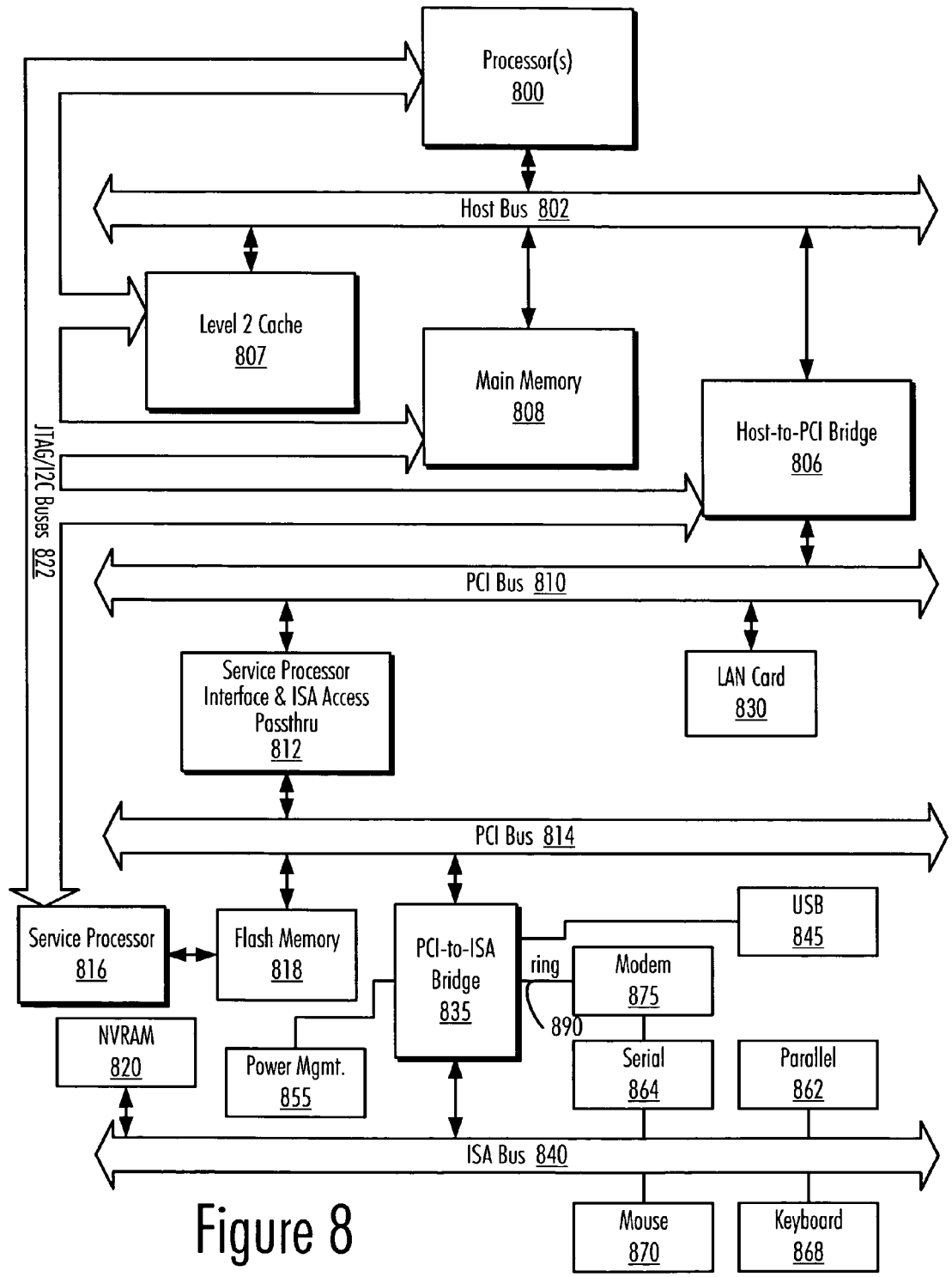
FIG. 8 is a block diagram of a data processing system in which a preferred embodiment of the present invention may be implemented.

FIG. 8 illustrates information handling system 801, which is a simplified example of a computer system capable of performing the computing operations of the host computer described herein with respect to a preferred embodiment of the present invention. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Passthrough 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C buses 822 for communication with processor(s) 800 during initialization steps. JTAG/I2C buses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of supporting the methods described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented process, comprising:
   instrumenting a program with a first aspect, wherein the first aspect is associated with a pointcut identifying data accesses and wherein the first aspect is associated with advice code that detects whether a data access will cause data from a first session to be accessed in conjunction with servicing a request associated with a second session, the first session and second session being distinct sessions;
   providing an associative data structure representing a mapping from objects into identifications of sessions, wherein the advice code consults the associative data structure to determine if in the associated data structure an object is associated with a session other than a current session;

instrumenting the program with a second aspect, wherein the second aspect is associated with additional advice code that registers an object with the associative data structure in the event that the object becomes associated with a session; and executing the instrumented program, wherein executing the instrumented program includes raising an exception in response to detecting a data access that will cause data from one session to be accessed in conjunction with servicing a request associated with another, distinct session.

* * * * *